United States Patent [19]

Hayashi et al.

[11] Patent Number: 5,146,240
[45] Date of Patent: Sep. 8, 1992

[54] IMAGE FORMING APPARATUS WITH PLURAL DOT DENSITIES

[75] Inventors: Takamasa Hayashi, Yokohama; Goro Mori, Tokyo; Shigeyuki Araki, Sagamihara; Masahiro Yamamoto, Hino; Masaru Takahashi, Kawasaki; Toshitaka Senma, Yokohama; Masami Miyajima; Takundo Isobe, both of Tokyo, all of Japan

[73] Assignee: Ricoh Company, Ltd., Tokyo, Japan

[21] Appl. No.: 650,952

[22] Filed: Feb. 5, 1991

[30] Foreign Application Priority Data

Feb. 8, 1990 [JP] Japan .................................. 2-27103

[51] Int. Cl.⁵ .............................................. H04N 1/21
[52] U.S. Cl. .................................. 346/108; 358/298; 355/246
[58] Field of Search .............. 346/108, 107 R, 160; 358/298, 296, 300, 302, 406; 355/246

[56] References Cited

U.S. PATENT DOCUMENTS

| | | | |
|---|---|---|---|
| 4,746,987 | 5/1988 | Traino et al. | 358/406 |
| 4,856,008 | 8/1989 | Senma et al. | 372/31 |
| 4,926,433 | 5/1990 | Imamura et al. | 372/50 |
| 4,977,414 | 12/1990 | Shimada et al. | 346/140 R |

FOREIGN PATENT DOCUMENTS 2-112961  4/1990  Japan .

Primary Examiner—Mark J. Reinhart
Attorney, Agent, or Firm—Cooper & Dunham

[57] ABSTRACT

An image forming apparatus which forms an image on a recording medium at a number of different dot densities. The image forming apparatus includes a light source part for emitting a light beam, a light detection part for detecting a light beam from the light detection part detecting a light beam from the light source part and for supplying a signal indicative of a power of the detected light beam when a monitored voltage obtained by the light beam is approximately equal to a reference voltage, a memory part for storing a number of power data corresponding to the number of different dot densities, an input part for inputting a first dot density selected, a power data control part for supplying a signal indicative of a power of the detected light beam with a power data stored in the memory means which is located by the selected first dot density, and a driving part for operating the light source with the signal from the power data control part allowing the light source to emit a light beam with the changed power, the changed power being appropriate for forming an image on the recording medium at the selected first dot density.

12 Claims, 5 Drawing Sheets

FIG.1 PRIOR ART
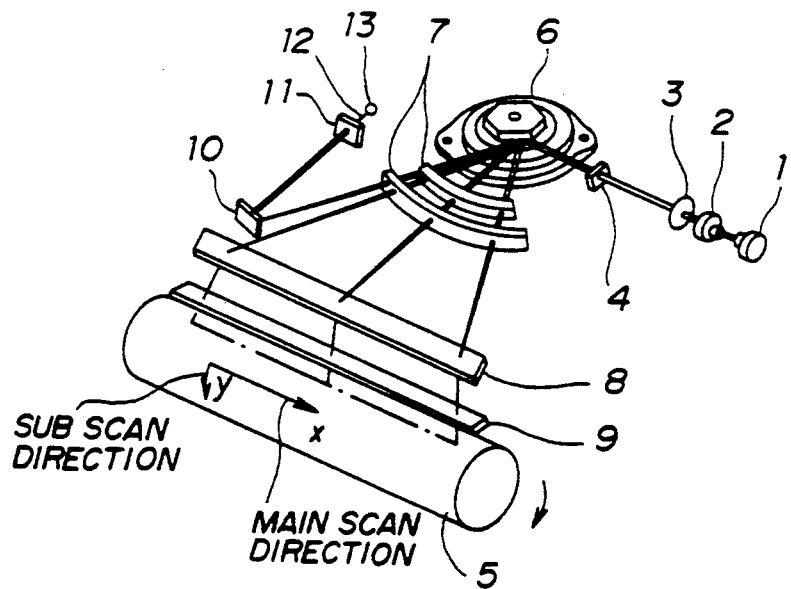
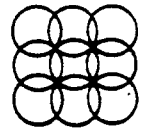
FIG.2A
400 DPI PITCH
400 DPI DOT DIA
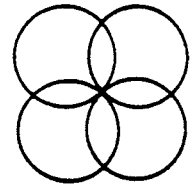
FIG.2B
200 DPI PITCH
200 DPI DOT DIA
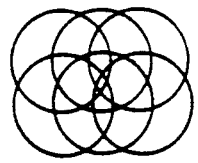
FIG.2C
400 DPI PITCH
200 DPI DOT DIA
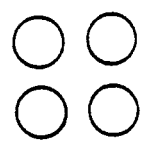
FIG.2D
200 DPI PITCH
400 DPI DOT DIA

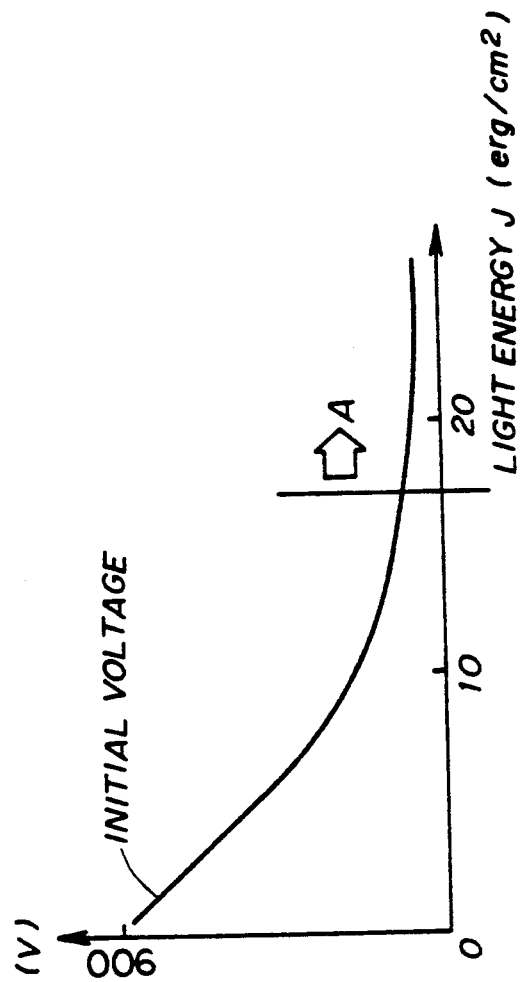

IMAGE FORMING APPARATUS WITH PLURAL DOT DENSITIES

BACKGROUND OF THE INVENTION

The present invention relates generally to image forming apparatus, and more particularly to an image forming apparatus which is capable of forming an image on a photosensitive medium at a number of different recording dot densities.

First, a description will be given of an optical scanning part of a conventional laser beam printer or digital copying machine. FIG. 1 generally shows the construction of this optical scanning part. A light beam is emitted from a laser diode (LD) 1 which is used as a light beam source, and this light beam is collimated by a collimate lens 2 into a collimated beam. An extra part of the collimated beam is eliminated from the light beam from the collimate lens 2 by an aperture 3, and the light beam is shaped into a shaped light beam. The aperture 3 has a slit with a size predetermined depending on the diameter of a dot of an image which is formed on a photosensitive medium 5. The shaped light beam passing through the aperture 3 is focused on a deflection surface of a polygonal mirror 6 by a cylindrical lens (#1) 4. The light beam from the cylindrical lens 4 is deflected on the deflection surface of the polygonal mirror 6, which is used as a deflector, toward the photosensitive medium 5, and is scanned in a main scan direction as indicated by an arrow x in FIG. 1, (in a longitudinal direction of the photosensitive medium 5) by rotation of the polygonal mirror 6. An f0 lens 7 allows the light beam from the polygonal mirror 6 to scan the photosensitive medium 5 at a constant speed in the main scan direction x, and serves to compensate for scanning distortion. The light beam from the f0 lens 7 is reflected on a mirror (#2) 8 to the photosensitive medium 5, and this reflected beam is focused by a cylindrical lens (#2) 9 in a sub scan direction, as indicated by an arrow y in FIG. 1. A sub scan is made in the sub scan direction y by rotation of the photosensitive medium 5 in step with the rotation of the polygonal mirror 6 for making a main scan of the light beam in the main scan direction x on the photosensitive medium 5. The thus converged light beam is irradiated on the photosensitive medium 5 to form an electrostatic image thereon.

On the other hand, a light detector 13 detects a light beam from the laser diode 1 once per scanning line, and supplies a synchronization control signal to a synchronization control part of the laser beam printer so as to control the timing with which the turning ON of the laser diode 1 starts. This light beam which is deflected on the surface of the polygonal mirror 6 is reflected by a mirror (#3) 10, and is focused by a cylindrical lens (#3) 11. The focused light beam passing through the cylindrical lens 11 is directed to the light detector 13 through an optical fiber 12.

However, the optical scanning part of the laser beam printer described above is constructed so as to form an electrostatic image on the photosensitive medium with dots having a fixed recording dot density D. For making a recording dot density D of the formed image variable, it is required to change a hardware of the optical scanning part including the aperture 3 an the cylindrical lens 4. And, to ensure good printing quality, it is important to change from the dot diameter of the image before the recording, dot density D is varied.

FIGS. 2A to 2D show a few examples of dot patterns when printing is made with different recording dot densities of 200 d (dots per inch) and 400 dpi. As shown in FIG. 2A and 2B, to ensure good printing quality when the recording dot density of 400 dpi as shown in FIG. 2A is changed to 200 dpi as shown in FIG. 2B, it is necessary to change also the 400 dpi dot diameter to the 200 dpi dot diameter. The adjacent dots of the image overlap each other appropriately. In FIG. 2C, however, the adjacent dots overlap excessively because printing is made at 400 dpi pitch with a 200 dpi dot diameter used. And, in FIG. 2D, printing is performed at 200 dpi pitch with a 400 dpi dot diameter used, and white blank spaces are left between the adjacent dots of the formed image. Thus, the printing quality of FIGS. 2C and 2D is worse than that of FIGS. 2A and 2B. Therefore, it should be noted that, to attain good printing quality when the recording dot density is changed, the dot diameter must also be changed in accordance with the changed recording dot density.

For making the dot pitch variable, there are several points which must be considered.

In performing the printing with the optical scanning part described above, a scanning frequency fv (Hz) for a scanning line is represented by the following formula.

$$fv = (D/25.4) V$$

In this formula, D is a recording dot density (number of dots per inch) and V is a linear speed of a photosensitive medium (mm/s). A rotating speed Rm (rpm) of a polygonal mirror is represented by the following formula.

$$Rm = fv(60/n) = (D/25.4)(V/n) \tag{1}$$

In this formula, n is the number of surfaces of the polygonal mirror. Therefore, $$D \propto Rm/V \tag{1}'$$

A clock signal frequency W (Hz) is represented by $$W = (fv/Er)(D/25.4)L$$

In this formula, Er is an effective scanning rate ($0 < Er < 1$) at which a main scan is made by a polygonal mirror, and L is an effective scanning width, and substituting (1) into the above formula makes $$W = (D/25.4)^2(1/Er)(V/n)L \tag{2}$$

Therefore, $$D \propto \sqrt{(W/V)} \tag{2}$$

To make the dot pitch or recording dot density variable, it is necessary to vary at least the photosensitive medium's linear speed V, the polygonal mirror's rotating speed Rm, and the clock signal frequency W.

In addition, in the image forming apparatus according to the present invention which uses an electrophotographic process for forming an electrostatic image, a light beam from the laser diode 1 is irradiated on a surface of the photosensitive medium 5 which surface of the photosensitive medium 5 is charged at a certain voltage level. The voltage of the charged photosensitive medium 5 is determined depending on the quantity of the irradiated light (or, light energy) supplied to the photosensitive medium 5. FIG. 3 generally shows the light attenuation characteristic of the light which is irradiated on the photosensitive medium 5. The relationship between the light energy P (erg/cm$^2$) and the recording medium voltage Vr is as shown in FIG. 3, and it is desirable to apply a voltage selected from in a saturation range, as indicated by an arrow A in FIG. 3, to the photosensitive medium 5. In this saturation range, the voltage applied to the photosensitive medium 5 must be in a saturated state. Once the voltage applied to the photosensitive medium 5 is given, the light energy J supplied to the laser diode 1 is determined in the basis of the light energy vs. recording medium voltage characteristic curve as shown in FIG. 3.

This light energy J which is given to the photosensitive medium 5 is proportional to a luminous power "P" of a light beam from the laser diode 1 and to a turning ON time "t" for which the laser diode 1 is turned ON. This is represented by:

$$J \propto P t \quad (3)$$

In this formal, it should be noted that, when the recording dot density D is varied and the clock signal frequency W is varied, the turning ON time t is accordingly changed because the turning ON time t is changed in proportion to the clock signal frequency W. Although the dot pitch may be changed to have an unchanged light energy per unit area, the luminous power P is varied when the recording dot density D is varied. Thus, in order to keep the light energy J constant, it is necessary to vary appropriately the quantity of light or luminous power of a light beam emitted from the laser diode 1. And, to change the dot diameter, it is necessary to change the size of the opening of the aperture 3 through which the light beam from the laser diode 1 passes. When the size of the opening of the aperture 3 is great, the light energy applied to the photosensitive medium 5 becomes great. Hence, in order to keep the light energy to the photosensitive medium 5 constant, the quantity of light supplied from the laser diode must be reduced.

As described above, for making the recording dot density variable, it is necessary to control suitably the clock signal frequency W, the polygonal mirror rotating speed Rm, the photosensitive medium linear speed v and the laser diode's luminous power P. However, in the conventional image forming apparatus, there is a problem in that, for making the recording dot density D variable, the hardware of the image forming apparatus must have a complicated structure, the manufacturing cost must be increased, and a plurality of variable elements must be prepared for a single optical scanning system which uses several different recording dot densities.

SUMMARY OF THE INVENTION

Accordingly, it is a general object of the present invention to provide an improved image forming apparatus in which the above described problems are eliminated.

Another and more specific object of the present invention is to provide an image forming apparatus which comprises a light source for supplying a light beam, a light detection part for detecting a light beam from the light source and for supplying a signal indicative of a power of the detected light beam when a monitored voltage obtained by the detected light beam is approximately equal to a reference voltage supplied to the light detection part, a memory part for storing a number of power data corresponding to a plurality of dot densities which are each prepared for use with the image forming apparatus, each the power data being stored in the memory part and a value of each the power data being predetermined with respect to each of the plurality of dot densities, an input part for inputting a first dot density which is selected from among the plurality of dot densities, a power data control part for supplying a signal indicative of a changed power data which is changed from a value of the power of the detected light beam indicated by the signal from the light detection part with a power data stored in the memory part which is located by the selected first dot density, and a driving part for controlling a power of the light beam emitted from the light source on the basis of the signal supplied from the power data control part allowing the light source to supply a light beam with the changed power, the changed power being appropriate for forming an image on the recording medium at the selected first dot density. According to the present invention, it is possible to obtain an appropriate quantity of light emitted from the light source when the recording dot density is changed so that a good printing quality is produced with only one reference voltage used in the automatic power control system. Therefore, it is no longer required to prepare two or more different reference voltages corresponding to several recording dot densities which are often required in a case of the conventional image forming apparatus which can use several different recording dot densities. And, the image forming apparatus of this invention can be built with a simple structure, and the manufacturing cost required can be reduced.

Other objects and further features of the present invention will be apparent from the following detailed description when read in conjunction with the accompanying drawings.

BRIEF DESCRIPTION OF THE DRAWINGS

FIG. 1 is a block diagram showing the construction of an optical scanning part of a conventional laser beam printer;

FIGS. 2A to 2D are diagrams for explaining the relationship between dot diameter and dot pitch with respect to a dot pattern of an image formed on a photosensitive medium;

FIG. 3 is a light attenuation characteristic curve of a photosensitive medium;

DESCRIPTION OF THE PREFERRED EMBODIMENT

Figure 4:
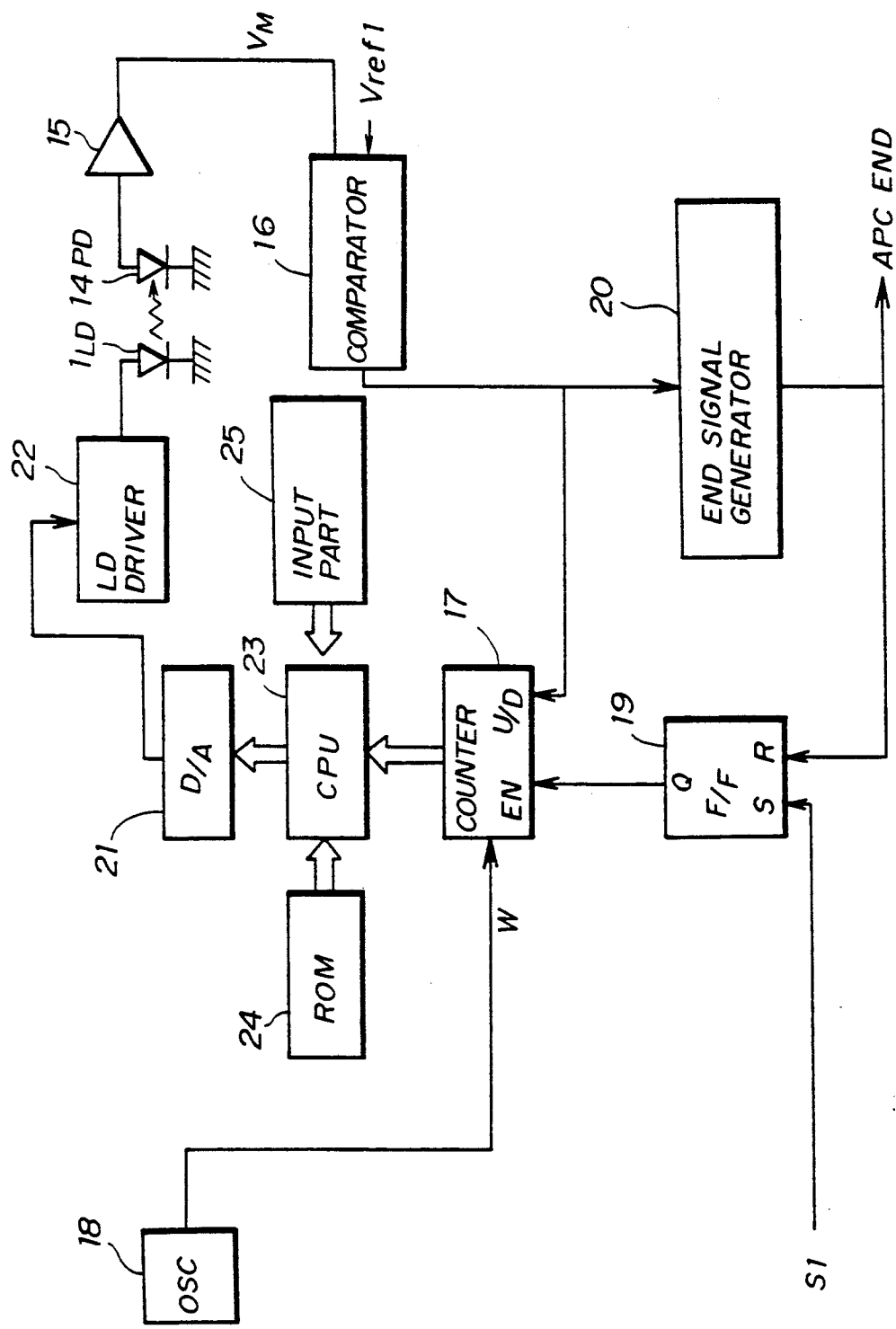
FIG. 4 is a block diagram showing the construction of an embodiment of an image forming apparatus according to the present invention.

First, a description will be given of an embodiment of an image forming apparatus according to the present invention. FIG. 4 generally shows the construction of an automatic power control system to which the present invention may be applied. This automatic power control system shown in FIG. 4 is constructed in order to automatically adjust a luminous power indicated by a power signal supplied to a light source driver for allowing a light source to emit a light beam having an appropriate luminous power. The laser diode 1 described above is used as the light source provided within the optical scanning part of the laser beam printer as shown in FIG. 1.

The automatic power control system as shown in FIG. 4 generally has the laser diode 1, a photo diode 14 which is used as a photodetector (PD), an amplifier 15, a comparator 16, an up/down counter 17, a clock signal generator (OSC) 18, a flip-flop (F/F) 19, an end signal generator 20, a digital-to-analog converter (D/A) 21, a laser diode driver 22, a microcomputer (CPU) 23, a read only memory (ROM) 24 and an input part 25. The photo diode 14 generates an electric current in proportion to the intensity of a light beam supplied from the laser diode 1 when the photo diode 14 is illuminated with the light beam supplied from the laser diode 1. And, the photo diode 14 supplies this electric current to the amplifier 15. The amplifier 15, which is provided to compensate for variations of a luminous power of the light source, converts the current from the photo diode 14 into a voltage Vm and supplies the voltage Vm to the comparator 16. This voltage Vm from the amplifier 15 is monitored by the comparator 16, that is, the comparator 16 compares the voltage Vm from the photodetector with a predetermined reference voltage Vref1, and supplies a signal to the up/down counter 17 and to the end signal generator 20. When the voltage Vm from the amplifier 15 is lower than the reference voltage Vref1 (Vm < Vref1), the signal supplied from the comparator 16 changes to a low level, and this low-level signal is supplied to a terminal (U/D) of the up/down counter 17. When the voltage Vm is higher than the reference voltage Vref1 (Vm > Vref1), the signal from the comparator 16 changes from a low level to a high level, and this high-level signal is supplied to the up/down counter 17 and to the end signal generator 20. When the signal from the comparator 16 changes from a low level to a high level, the end signal generator 20 detects the change of the signal from the comparator 16 and generates a power control end signal APC END which is supplied to a terminal R of the flip-flop 19. As the flip-flop 19 is reset, the up/down counter 17 returns back to a DISABLE state and stops a counting of clock signal pulses from the clock signal generator 18.

The clock signal generator 18 generates a clock signal indicative of the clock signal frequency W described above, and this clock signal is supplied to a terminal of the up/down counter 17. The flip-flop (F/F) 19 is turned ON by a power set signal S1 which is supplied to a terminal (S) of the flip-flop 19 to start a laser diode power setting procedure. The flip-flop 19 is turned OFF by a power control end signal APC END which is supplied from the end signal generator 20 to a terminal (R) of the flip-flop 19 when the end signal generator 20 detects a change of the level of the signal supplied from the comparator 16. Then, the flip-flop 19 supplies a signal from a terminal (Q) thereof to a terminal (EN) of the up/down counter 17 to enable the up/down counter 17 to start a counting of clock signal pulses from the clock signal generator 18. The end signal generator 20 detects a rise or fall of the signal supplied from the comparator 16 and supplies a power control end signal APC END to the flip-flop 19. The digital-to-analog (D/A) converter 21 and the laser diode (LD) driver 22, for which a conventional digital-to-analog converter circuit and a laser diode driving circuit may be used, are both a known circuit. According to the present invention, the LD driver 22 is controlled by an analog signal outputted from the D/A converter 21 to adjust appropriately a luminous power of a light beam emitted from the laser diode 1. The analog signal from the D/A converter 21 is determined on the basis of the signal supplied from the up/down counter 17, the signal indicative of a count value concerning the clock signal pulses from the clock signal generator 18.

As shown in FIG. 4, in the automatic power control system to which the present invention is applied, the microcomputer (CPU) 23, the read only memory (ROM) 24 and the input part 25 are provided between the up/down counter 17 and the digital-to-analog converter 21. For making the recording dot density variable, it is necessary to change the luminous power of the light beam emitted from the laser diode 1. In the read only memory 24, a number of luminous power data corresponding to a plurality of different recording dot densities other than a reference recording dot density are already stored. A selected recording dot density which is selected from among the plurality of the recording dot densities is inputted from the input part 25 to the microcomputer 23. For example, in this automatic power control system, a 200 dpi printing is carried out with the required luminous power P1 of the light beam from the laser diode 1. A reference voltage Vref1 which is supplied to the comparator 16 is previously recorded. The set of luminous power data, which are already stored in the read only memory 24, each have a value which is predetermined from the reference voltage Vref1 supplied to the comparator 16, and from a given optical characteristic data of the laser diode 1 which is used as the light source. To change the required luminous power to P2 for the laser diode 1 to supply an appropriate quantity of light when the recording dot density is changed to 400 dpi, it is necessary to prepare a different reference voltage Vref2 other than the reference voltage Vref1. And, additional reference voltages must be prepared for each of recording dot densities which can be selected with the laser beam printer. As it may be assumed that the input/output characteristics of the D/A converter 21 is given from the experimental data, once a digital data input to the D/A converter 21 is determined, an appropriate value of luminous power P2 may be predicted by making use of the microcomputer 23 and the read only memory 24. According to the present invention, only one reference voltage Vref1 is prepared and stored in the read only memory 24 for carrying out automatic power control resulting in a stable output of a luminous power to the laser diode 1 when a printing is made with a reference recording dot density used. And, when a printing is performed with a different recording dot density that is changed from the prepared reference recording dot density, the value of the required picture luminous power to the D/A converter 21 through the automatic power control is corrected by the microcomputer 23 on the basis of the power data stored in the read only memory 24 corresponding to the different recording dot density changed. The corrected data is supplied from the microcomputer 23 to the D/A converter 21 so that the quantity of light emitted from the laser diode 1 is suitably adjusted to result in a different recording dot density of dots in the image formed by the laser beam printer.

Figure 6:
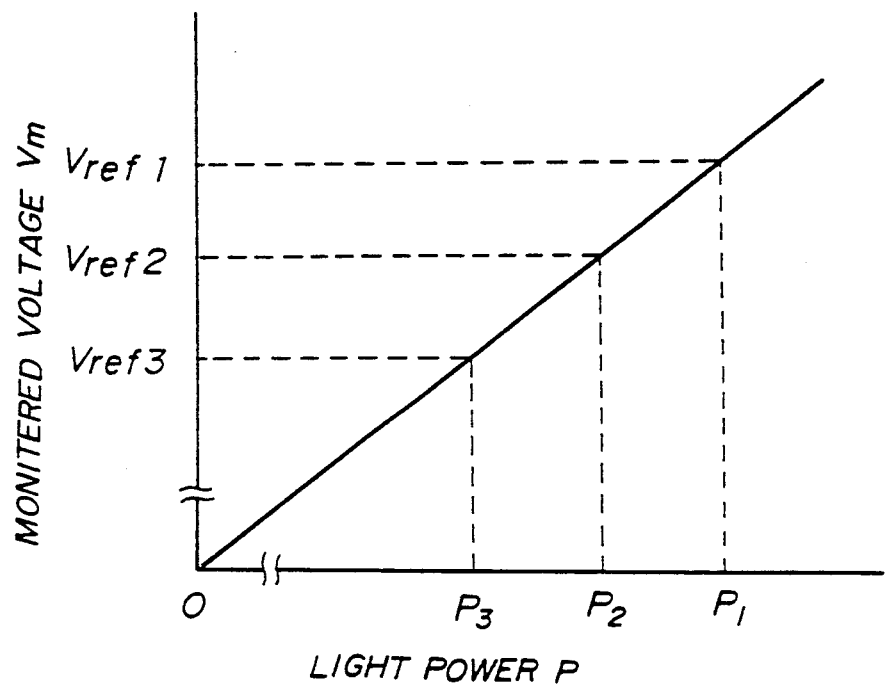
FIG. 6 is a diagram for explaining the relationship between a light power and a monitored voltage used in the image forming apparatus of FIG. 4.
Figure 7:
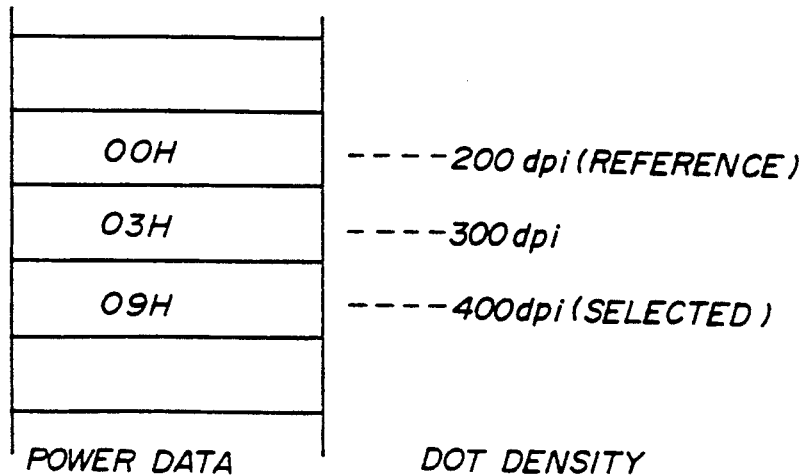
FIG. 7 is a diagram for explaining the contents of a memory part provided in the image forming apparatus of FIG. 4.

Next, a description will be given of the operation of the automatic power control system shown in FIG. 4 when the recording dot density is changed from 200 dpi to 400 dpi, with reference to FIGS. 5 through 7. For making the recording dot density variable with the conventional image forming apparatus, it is required to prepare a plurality of apertures having openings different in size from each other, these openings corresponding to the dot densities, respectively, which are each prepared for use with the image forming apparatus. As shown in FIG. 6, it is assumed that the luminous power of a light beam of the laser diode 1 required for a certain aperture 3 prepared is Pl, and it may be predicted from the characteristic chart of the laser diode 1 that a monitored voltage for the required luminous power Pl is Vrefl. This monitored voltage Vrefl is supplied to the comparator 16.

Figure 5:
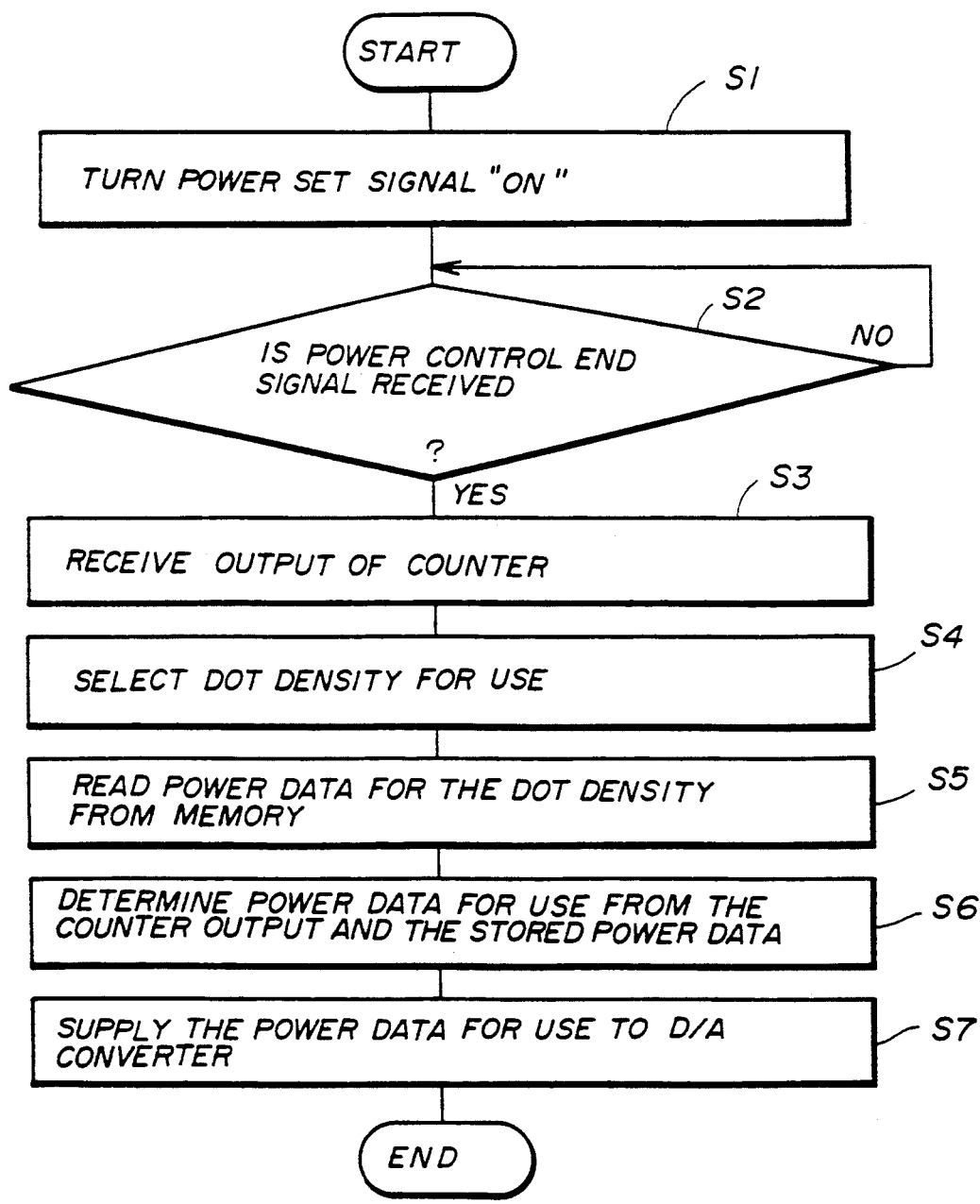
FIG. 5 is a flow chart for explaining the operation of the image forming apparatus shown in FIG. 4.

Referring to FIG. 5, as a certain-level voltage is applied to the LD driver 22 to drive the laser diode 1 for supplying a light beam with a given luminous power to the above optical scanning part, resulting in an image being formed on the photosensitive medium 5 at a changed recording dot density. A photo diode 14 which is used as a photodetector detects this light beam from the laser diode 1 and supplies an electric current to the amplifier 15, this electric current being in proportion to the light intensity or power of the light beam supplied from the laser diode 1. The electric current from the photo diode 14 is converted by the amplifier 15 into a monitored voltage Vm, and this monitored voltage Vm is supplied to the comparator 16. The comparator 16 then compares the voltage Vm from the light source with the predetermined reference voltage Vrefl supplied to the comparator 16, and supplies a signal to the terminal U/D of the up/down counter 17. At the beginning of a stand-by mode of the flip-flop 19, a power set signal S1 is supplied to the terminal S of the flip-flop 19, allowing a signal to be supplied to the terminal EN of the up/down counter 17, thereby the counter 17 being set in an ENABLE operation mode. A level of the signal from the comparator 16 to the up/down counter 17 changes to a low level when the monitored voltage Vm from the amplifier 15 is lower than the reference voltage Vrefl (Vm<Vrefl). In this case, while the power of light emitted from the laser diode 1 does not yet exceed the reference light power Pl, the up/down counter 17 is continuously operating in a count-up mode and a count output from the up/down counter 17 is incremented repeatedly with this low-level signal supplied to the terminal U/D of the counter 17. When the monitored voltage Vm from the amplifier 15 is higher than the reference voltage Vrefl (Vm>Vrefl), a level of the signal from the comparator 16 changes to a high from the low level. In this case, as the power of light emitted from the laser diode 1 exceeds the reference power level Pl, the up/down counter 17 operates in a count-down mode and a count output from the counter 17 is decremented repeatedly when the high-level signal is supplied to the up/down counter 17. The up/down counter 17 counts the number of pulses of the clock signal (which has a clock signal frequency W) supplied from the clock signal generator 18 either in the count-up mode or in the count-down mode depending on which signal input is supplied from the comparator 16 to the up/down counter 17.

The flip-flop 19 is reset by a power control end signal which is supplied to the terminal R thereof, and the up-down counter 17 is then set in a DISABLE state by a signal supplied from the flip-flop 19 to stop the counting of the pulses of the clock signal from the clock signal generator 18.

According to the automatic power control system shown in FIG. 4, the automatic power control procedure is carried out by the microcomputer 23 for stabilizing the power of light supplied from the laser diode 1 when the reference recording dot density is selected. A signal outputted from the up/down counter 17 is supplied by the microcomputer 23 to the D/A converter 21, and this signal is converted into an analog signal. The analog signal from the D/A converter 21 is supplied to the LD driver 22, then a power of light from the laser diode 1 is suitably adjusted. The automatic power control is thus carried out for controlling the power of light from the laser diode appropriately. More specifically, as a count output from the up/down counter 17 increases little by little, the intensity of light emitted from the laser diode 1 increases gradually and the monitored voltage Vm applied to the comparator 16 gradually becomes higher through the automatic power control. As the monitored voltage Vm is greater than the reference voltage Vrefl, the signal outputted from the comparator 16 changes from a low level to a high level (or vice versa). The end signal generator 20 detects this change of the signal from the comparator 20 and supplies a power control end signal to the terminal R of the flip-flop 19 to reset the flip-flop 19, thereby the counter returning back to a disable state. The counter 17 holds the count before the change of the signal from the comparator 16 occurs, and the magnitude of a driving current supplied to the laser diode 1 is maintained to stabilize the power of light supplied from the laser diode 1. In this case, the voltage Vm from the amplifier 15 is approximately equal to the reference voltage Vrefl, and the power of light from the laser diode is adjusted approximately to the luminous power Pl which is determined with the reference voltage Vrefl.

And, the automatic power control procedure is carried out by the microcomputer 23 and the memory 24 when a recording dot density (for example, 400 dpi) different from the reference recording dot density (for example, 200 dpi) is selected. As shown in FIG. 5, a power set signal S1 is supplied to the flip-flop 19 by the microcomputer 23 to start an automatic power control (step S1 in FIG. 5). A step S2 checks whether a power control end signal APC END is supplied by the end signal generator 20 to the terminal R of the flip-flop 19. While the flip-flop 19 does not receive the power control end signal from the end signal generator 20 ("NO" in step S2), the automatic power control is continuously carried out. When the flip-flop 19 receives the power control end signal ("YES" in step S2), the count output from the up/down counter 17 is a constant value and a next step S3 is taken. In this step S3, the microcomputer 23 receives a signal indicative of the current luminous power of the light beam, which is the count output from the up/down counter 17. A step S4 selects a recording dot density for use of the optical scanning part in forming an electrostatic image on the photosensitive medium 5. The selected dot density is inputted from the input part 25 to the microcomputer 23. Next, a step S5 reads a power data already stored in the read only memory 24, which is located in the read only memory 24 with the selected dot density. A step S6 is for the microcomputer 23 to calculate a new power data for use, or a digital input data to the D/A converter 21, from the power data located in the read only memory 24 and the count output of the up/down counter 17 read by the microcomputer 23 in the step S3. For example, assume that the count output from the up/down counter 17 is 8B (H) and the selected dot density is 400 dpi. And, a power data corresponding to the selected dot density is for example 09 (H), which is stored in the read only memory 24, as shown in FIG. 7. The microcomputer 23 then determines a new power data by subtracting the power data (09 H) for the selected dot density (400 dpi) from the count output (8B H) from the up/down counter 17, resulting in the new changed power data equal to 82 H which is a digital input data to the D/A converter 21. A step S7 supplies such a digital input data (for example, 82 H) calculated by the microcomputer 23 to the D/A converter 21 so that the LD driver 22 controls appropriately the laser diode 1, allowing the laser diode 1 to emit a light beam with the new power data (82 H) which corresponds to the selected recording dot density (400 dpi).

As described above, when the reference recording dot density is used by the optical scanning part, the microcomputer 23 reads the count of the up/down counter 17 and continuously carries out the automatic power control procedure. On the other hand, when a recording dot density different from the reference recording dot density, the automatic power control is carried out on the basis of the power data stored in the read only memory 24 and of the count of the up/down counter 17. That is to say, it is not required to set up previously a plurality of reference voltages being inputted to the comparator 16, the plurality of reference voltages corresponding to different recording dot densities which are each prepared for use with the image forming apparatus.

In this concern, Japanese Laid-Open Patent Application No. 2-112961 (corresponding to U.S. Pat. No. 4,977,414) discloses an image forming apparatus which uses a plurality of recording dot densities in a single optical scanning unit. But there is no description which definitely explain how to select an aperture from among a plurality of different apertures for a desired recording dot density. And, the power modulation data described in the prior art document relates to selection intervals at which adjacent dot blocks are selected, and to the quantity of a luminous power change required. In the present invention, the power data with respect to a difference between luminous power and reference luminous power due to a difference in size of the aperture openings. In other words, Japanese Laid-Open Patent Application No. 2-112961 concerns the control of power modulation during an optical scanning after a dot density is selected, while the present invention relates to an automatic control of a power of a light beam from a light source when a desired dot density is selected.

Further, the present invention is not limited to the above described embodiment, and variations and modifications may be made without departing from the scope of the present invention.

What is claimed is:

1. An image forming apparatus comprising:
light source means for emitting a light beam;
light detection means for detecting a light beam from the light source means and for supplying a signal indicative of a power of the detected light beam when a voltage obtained by the detected light beam is approximately equal to a reference voltage corresponding to a reference dot density;
memory means for storing a number of power data corresponding to a plurality of dot densities including said reference dot density, and which are each prepared for use with the image forming apparatus each said power data stored in the memory means being predetermined with respect to each of said plurality of dot densities;
input means for inputting a first dot density which is selected from said plurality of dot densities;
power data control means for supplying a signal indicative of a changed power data which is changed from a value of said power of the detected light beam indicated by said signal from the light detection means with a power data stored in the memory means which is located by the selected first dot density; and
driving means for controlling the power of the light beam emitted by the light source means on the basis of the signal supplied from the power data control means, allowing the light source means to supply a light beam with said changed power which is appropriate for an image being formed on the recording medium at the selected first dot density.

2. The apparatus as claimed in claim 1, wherein said power data control means determines said changed power data by subtracting a power data among the number of power data stored in the memory means from a value of said power of the detected light beam supplied from the light detection means, said power data being located among the number of power data in the memory means by the selected first dot density inputted from the input means.

3. The apparatus as claimed in claim 1, wherein said number of power data stored in the memory means are each predetermined from the reference voltage supplied to the light detection means and from a predetermined optical characteristic data of the light source means.

4. The apparatus as claimed in claim 3, wherein said light source means comprises a laser diode which emits a laser light with a power appropriately controlled by said driving means for forming a dot on the recording medium, said laser diode having the predetermined optical characteristic data from which the number of power data are predetermined and stored in the memory means.

5. The apparatus as claimed in claim 1, wherein said light detection means comprises a photo diode for receiving a light beam supplied from the light source means and supplying a current in proportion to the power of the received light beam of said photo diode, an amplifier for converting said current into a voltage and supplying a signal indicative of said voltage to the power data control means, and a comparator for supplying a second signal indicative of whether or not said voltage from the amplifier is greater than the reference voltage supplied to the comparator.

6. The apparatus as claimed in claim 1, wherein said power data control means comprises means for outputting a signal indicative of a stabilized power of the detected light beam from the light detection means to said driving means so that the power of the light beam supplied from the light source means is stabilized when a reference dot density among the plurality of dot densities is inputted from said input means to the power data control means.

7. The apparatus as claimed in claim 1, wherein the power data control means comprises means for calculating a changed power data of the light beam from the selected dot density and from a power data among the number of power data stored in the memory means when the selected dot density different from a reference dot density is inputted from said input means.

8. The apparatus as claimed in claim 1, wherein only one reference voltage is supplied to said comparator for comparing a monitored voltage of the detected light beam with said only one reference voltage.

9. An image forming apparatus comprising:
a recording medium;
light source means for emitting a light beam;
optical scanning means, provided between the recording medium and the light source means, for scanning the recording medium by deflecting said light beam emitted from the light source means to thereby form an image on the recording medium;
light detection means for detecting a light beam emitted from the light source means and for supplying a signal indicative of a power of the detected light beam when a voltage obtained by the detected light beam is approximately equal to a reference voltage corresponding to a reference dot density;
memory means for storing a number of power data corresponding to a plurality of dot densities including said reference dot density, which are each prepared for use with the image forming apparatus each said power data stored in the memory means being predetermined with respect to each of said plurality of dot densities;
input means for inputting a first dot density which is selected from said plurality of dot densities;
power data control means for supplying a signal indicative of a changed power data which is changed from a value of said power of the detected light beam indicated by said signal from the light detection means with a power data stored in the memory means which is located by the selected first dot density; and
control means for controlling the light source means on the basis of image data and said signal supplied from the power data control means allowing the light source means to supply a light beam with the changed power, said changed power being appropriate for forming an image on the recording medium at the selected first dot density,
wherein said power data control means determines said changed power data by subtracting a power data among the number of power data stored in the memory means from a value of said power of the detected light beam supplied from the light detection means, said power data being located among the number of power data in the memory means by the selected first dot density inputted from the input means.

10. The apparatus as claimed in claim 9, wherein said number of power data stored in the memory means are each predetermined from the reference voltage supplied to the light detection means and from a predetermined optical characteristic data of the light source means.

11. The apparatus as claimed in claim 10, wherein said light source means comprises a laser diode which emits a laser light with a power appropriately controlled by said driving means for forming a dot on the recording medium, said laser diode having the predetermined optical characteristic data from which the number of power data are predetermined and stored in the memory means.

12. The apparatus as claimed in claim 1, wherein said image forming apparatus allows the light source means to emit a light beam with a changed power corresponding to a dot density that is different from the reference dot density and selected from said plurality of dot densities, after the power of the light beam, corresponding to the reference dot density, has been controlled.

* * * * *